United States Patent [19]

Kemmler

[11] Patent Number: 5,294,972
[45] Date of Patent: Mar. 15, 1994

[54] MULTI-AXIS FIBER OPTIC ROTATION RATE SENSOR WITH PARALLEL SENSING COILS

[75] Inventor: Manfred Kemmler, Vörstetten, Fed. Rep. of Germany

[73] Assignee: Litef GmbH, Freiburg im Breisgau, Fed. Rep. of Germany

[21] Appl. No.: 850,870

[22] Filed: Mar. 13, 1992

[30] Foreign Application Priority Data

Mar. 18, 1991 [DE] Fed. Rep. of Germany ........ 4108807

[51] Int. Cl.$^5$ .............................................. G01C 19/72
[52] U.S. Cl. .................................................... 356/350
[58] Field of Search ........................................ 356/350

[56] References Cited

U.S. PATENT DOCUMENTS

| 4,815,853 | 3/1989 | Lefevre | 356/350 |
| 5,150,956 | 9/1992 | Buhler et al. | 356/350 |
| 5,184,195 | 2/1993 | Goldner | 356/350 |

FOREIGN PATENT DOCUMENTS 0288032 10/1988 European Pat. Off.
0400197 12/1990 European Pat. Off.

*Primary Examiner*—Samuel A. Turner
*Attorney, Agent, or Firm*—Elliott N. Kramsky

[57] ABSTRACT

A multi-axis fiber-optic rotation rate sensor arrangement of I/O opto-electronics (MCS) is based upon single-axis rotational rate sensor arrangements and includes a low-frequency transformation of the output signal at the photodetector by pulsed operation of the light source. The light path is divided into n independent closed light paths downstream of a main beam splitter and a phase modulator whose lengths are in the ratio $L_1:L_2:L_3:\ldots:L_n = 1:2:3:\ldots:n$. The light source is switched ON/OFF with a pulse duty factor whose ON duration corresponds to the transit time of light through the shortest fiber coil $L_1$ and whose OFF duration is at least equal to the transit time of light through the longest of the fiber coils $L_n$. The signals are distinguished either downstream of the photodetector by time-division multiplex or at the phase modulator, where the signal is virtually blanked by the corresponding bias phase application with $\pm\pi\cdot n$, delivering minimal rotation rate information, or has applied to it a bias phase of $\pm\pi(n+\frac{1}{2})$ to deliver maximum rotation rate information (n a positive integer). The use of common I/O opto-electronics for all the light paths results in substantial cost savings, reduced space requirements, lower power absorption and enhanced reliability.

3 Claims, 2 Drawing Sheets

MULTI-AXIS FIBER OPTIC ROTATION RATE SENSOR WITH PARALLEL SENSING COILS

BACKGROUND

1. Field of the Invention

The present invention relates to rotation rate sensors more particularly, this invention pertains to a multi-axis fiber optic rotation rate sensor.

2. Description of the Prior Art

A minimal configuration of a single-axis fiber optic rotational speed sensor (refer to FIG. 1) comprises a light source LQ, a first beam splitter $ST_1$, a polarizer P, a second beam splitter $ST_2$, a phase modulator PM and a connected fiber coil F combined in a dashed border MCS (Minimal Configuration Single-axis) forming a circuit arrangement (circuit block). The returning light beams, affected by the fiber coil, are coupled out at a second output of the first beam splitter $ST_1$ and pass to a photodetector PD whose electrical signals are applied to an A/D converter AD that feeds a known digital signal readout, and a closed loop CL for resetting a (possible) Sagnac phase. The reset signal is applied via a D/A converter DA to the phase modulator PM in a known arrangement.

It has been proposed in European patent application Serial No. EP-A1-0,400,197 to operate the light source LQ in a pulsed fashion to simplify evaluation of the readout signal and permit the use of low-cost converter modules and microprocessors. More particularly, that patent application proposes operating LQ so that the operating time corresponds precisely to the transit time of light through the fiber coil F. This enables one to transform the output signal at the photodetector PD in a low-frequency fashion so that further processing can take place at frequency bands that are readily controlled.

The measurement of a plurality (in particular, three) independent rotation rates by means of the above described minimal configuration of FIG. 1 has required a corresponding plurality of independent fiber gyro structures. This is unfortunate as the subassemblies or modules bounded by the circuit block MCS of FIG. 1 contain, at least in part, very expensive components. For example, when a superluminescent diode is used for the light source LQ, a Peltier element having an assigned control circuit is required for temperature stabilization.

U.S. patent application Ser. No. 4,588,296 (refer particularly to FIG. 40B and accompanying description) discloses a three-axis fiber-optic rotational rate sensor in which, after passing through a space filter, the light is split into three identical beam pairs by a beam-splitter module fabricated in integrated optics. The beams are radiated into three identical fiber coils aligned along the three spatial axes. The three readout signals may be separated and distinguished by multiplex selection and evaluation. This triad arrangement is affected by a fundamental technological problem resulting from the fact that exceptionally high frequencies must be processed during readout and in the reset electronics. This problem becomes more acute when the lengths of the individual fiber coils are shortened.

SUMMARY AND OBJECTS OF THE INVENTION

It is therefore an object of the present invention to create a low cost multi-axis fiber optic rotational rate sensor that makes multiple use of electronic and optical modules.

The preceding and other objects are addressed by the present invention which provides an improvement in a multi-axis fiber optic rotational rate sensor of the type that includes a light source followed in sequence by a first beamsplitter, a polarizer, a second beamsplitter and a phase modulator. Such sensor further includes a photodetector that accepts a second output of the first beamsplitter and a analog-to-digital converter that is coupled to the photodetector. The converter feeds a closed loop for resetting rotational rates through a digital-to-analog converter that is connected to a reset input of the phase modulator.

The improvement provided by the invention to such a sensor includes a coupler that is connected to the outputs of the phase modulator for dividing the two modulated output light beams of the second beamsplitter into an equality plurality of light beam pairs that radiate in pairs into the two ends of a corresponding plurality of fiber coils. The lengths of the light paths of the coils are in the ratio $L_1:L_2:L_3:\ldots:L_n = 1:2:\ldots:n$. In addition, the light source is switched with a pulse-duty factor whose ON duration corresponds to the transit time of light through the shortest fiber coil and whose OFF duration is at least equal to the transit time of light through the longest coil.

In a preferred application (independent measurement of rotation rate along three orthogonal spatial axes by correspondingly-aligned fiber coils) it is an essential feature of the invention from both electrical and optical considerations that the coils are connected in parallel and their lengths are in the ratio of $L_1:L_2:L_3 = 1:2:3$. A light pulse of duration or "length" $\leq L_1$ produces a pulse train at the photodetector of three separate pulses that can be uniquely assigned to the three coils. In this case, the "length" of the pulse refers to the transit time of light through the shortest fiber coil $L_1$. Consequently, it is possible (i.e. by means of time-division multiplexing) to measure rotational rates along all three spatial axes.

As explained in European patent application Serial No. EP-A1-0,400,197 it is necessary to gate two of the pulses in each case to employ low-frequency evaluation electronics. Such gating is best performed by forcing a $\pi$ phase shift in each case at the phase modulator for the two undesired pulses at a specific evaluation instant. As a result, the operating point is positioned at the minimum of a cosine function that delivers virtually no readout signal. The $\pi$ phase shift is possible as, due to the differing lengths of the fiber coils, the pulses pass the phase modulator one after another. As soon as the fiber coils are again "empty of light", a further pulse can be sent.

It is an essential advantage of the invention that the components or modules bordered in FIG. 1 by the block MCS need be present only once for an n-axis rotational speed sensor arrangement.

The preceding and other features and advantages of this invention will become further apparent from the detailed description that follows. This description is accompanied by a set of drawing figures. Numerals of the drawing figures, corresponding to those of the written description, point to the features of the invention. Like numerals refer to like features throughout.

DETAILED DESCRIPTION

Figure 1:
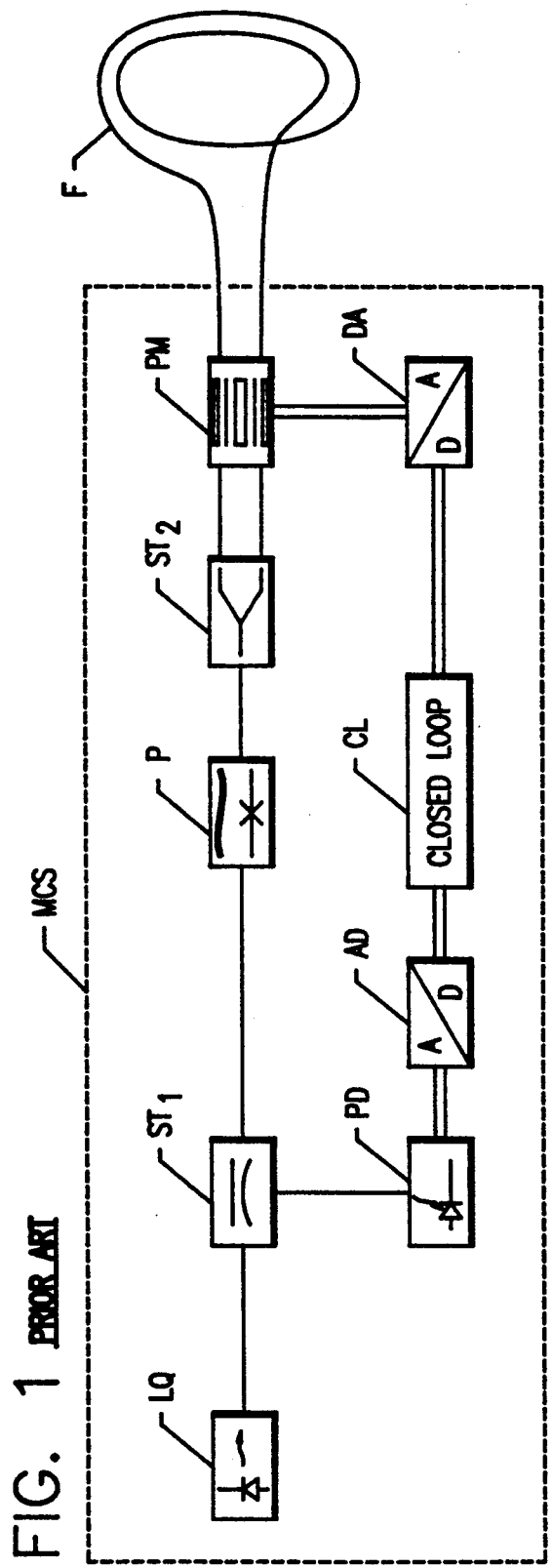
FIG. 1 is a block diagram of a single-axis fiber optic gyro in accordance with the prior art.
Figure 2:
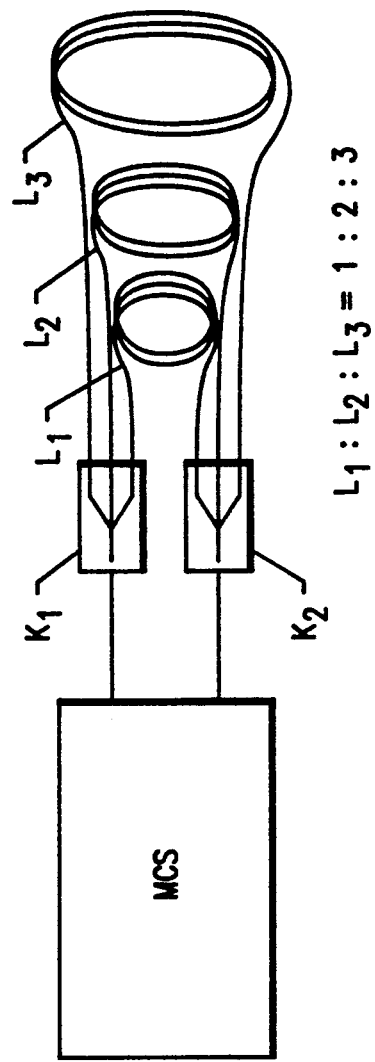
FIG. 2 is a basic schematic diagram of a triaxial fiber optic gyro in accordance with the invention.
Figure 3:
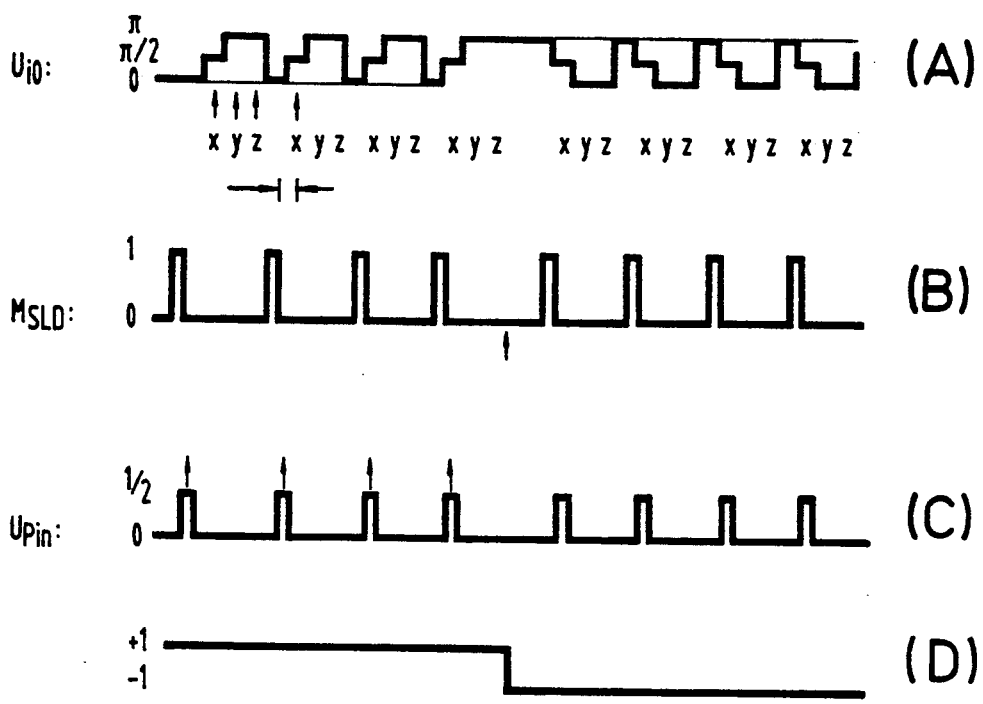
FIGS. 3(A) through 3(D) is a series of waveforms for illustrating time-correlated signals for optimizing readout per axis of a triaxial rotation rate sensor in accordance with FIG. 2.

Turning to the drawings, a basic schematic block diagram of a triaxial fiber optic gyro in accordance with the invention is illustrated in FIG. 2. In the illustrated arrangement, the block MCS corresponds in operation to the electro-optical selection, control and evaluation electronics of FIG. 1. In contrast, couplers K1 and K2 respectively are connected to the two outputs of the modulator PM for dividing the respectively incident light beam into three equal component light beams.

The component light beams are assigned and radiated in pairs into the ends of three fiber coils $L_1$, $L_2$ and $L_3$ having lengths in the ratio $L_1:L_2:L_3 = 1:2:3$. The axes of the three coils $L_1$, $L_2$ and $L_3$ are mutually orthogonal. The single light source LQ is operated in a pulsed fashion. That is, it is driven with a pulse duty factor characterized by an operating time (ON duration) corresponding to the propagation or transit time of light through the shortest fiber coil $L_1$ and a non-operating time (OFF duration) equal to or greater than the propagation time of light through the longest fiber coil $L_3$. The separation and individual evaluation of the response or readout signals of the three fiber coils is achieved when this condition is met. A discussion of the principle of operation of the device disclosed in the European patent application Serial No. EP-A1-0,400,197 is briefly summarized with reference to FIGS. 3(A) through 3(D). This discussion is applicable to the principles pertaining to selection and readout of sensor signals associated with the spatial axes of the invention.

The light source LQ, preferably a superluminescent diode, is periodically switched ON/OFF (refer to FIG. 3(B) with the operating time (or level 1) being somewhat shorter or equal in duration to the circulation time of light through the shortest fiber coil $L_1$. The duration of the non-operating time (level 0) is at least equal to the propagation time of light through the longest fiber coil $L_3$. To evaluate the signals for a first spatial axis, assigned the shortest fiber in the example (x-channel), a bias signal whose temporal characteristic is shown in FIG. 3(A), is applied to the phase modulator PM. During a first half period of the evaluation, the bias signal of the x-channel is $\pi/2$ (or $-(n+\frac{1}{2})\cdot\pi$.) The bias level changes to $-\pi/2$ (or $-n+\frac{1}{2})\cdot\pi$; n being a positive integer) during a second half period of the evaluation. The bias signal is at $\pm\pi$ (or $n\cdot(\pm\pi)$; n being a positive integer) for the signals of the two other fiber coils $L_2$, $L_3$. (y-channel or z-channel). The demodulator reference (refer to FIG. 3(D)) changes, as explained in European patent application Serial No. EP-A1-0,400,197, with the change in the bias level at the phase modulator PM.

Figure 4:
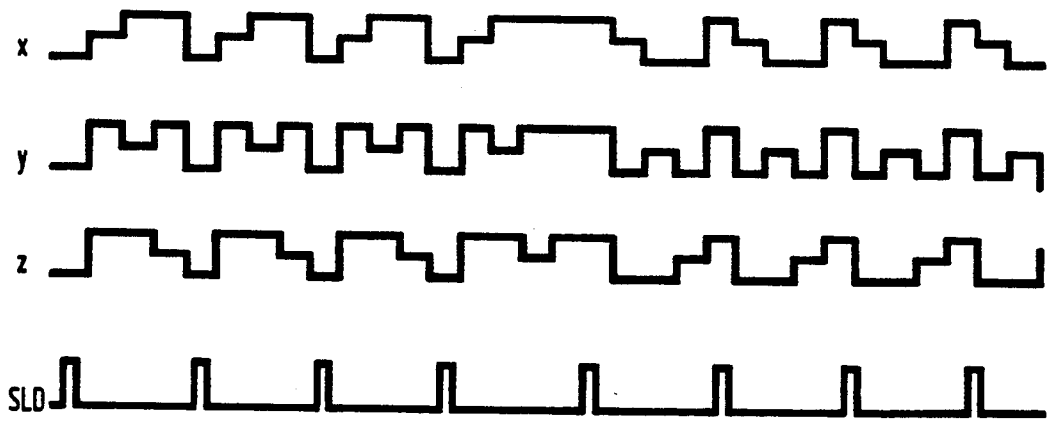
FIG. 4 is a set of waveforms for illustrating the time-correlated selection signals for the phase modulator in the time-division multiplex readout of the three axes.

FIG. 4 illustrates the phase modulator selection signals for sequential (time-division multiplex) readout of the rotational rate signals for the three spatial axes (i.e. for the channels x, y and z.) Once again, the selection pulses of the light source LQ (superluminescent diode SLD) are shown at the lowermost line. The phase modulator PM bias signals during readout of the x-channel are represented at the uppermost line corresponding to the representation of FIG. 3(A). The procedure for reading out the y-channel signals corresponds precisely. That is, the bias signals alternate between $\pm\pi/2$ (or $\pm\pi\cdot n$; n a positive integer) for the time slot assigned to the y-channel. During the y-channel readout time, the bias level during occurrence of the x-channel or z-channel signals is positioned at an operating point minimum of the characteristic curve. This follows a cosine function of the Sagnac phase. That is, while the y-channel is being evaluated, a bias signal corresponding to a $\pm\pi$ (or $\pm\pi\cdot n$; n being a positive integer) phase shift is applied to the phase modulator for the x-channel or the z-channel.

The procedure for reading out the signals of the third spatial axis (z-channel) corresponds precisely, as may be readily observed from the third line of the waveforms of FIG. 4. The essential features of a multi-axis rotational rate sensor according to the invention in contrast to a single-axis closed-loop fiber gyro may be summarized as follows:

1. After the second beamsplitter $ST_2$ (main beam splitter) and the phase modulator PM, the light path is divided into n (preferably three) independent, closed light paths.
2. The respective lengths of the individual light paths are in the ratio $1:2:3:4: \ldots m$.
3. The light source LQ is switched on for at most a time $T_1$ that precisely corresponds to the circulation time of light through the shortest light path, then switched off for $nT_1$.
4. Consequently, n pulses propagate through the phase modulator PM with temporal sequence corresponding to the propagation time through the respective light path. That is, each pulse is affected by a different item of rotational rate information and can be individually modulated.
5. This pulse train is likewise present at the photodetector PD.
6. The signals are distinguished either downstream of the photodetector PD by time-division multiplex evaluation or blanking, or at the phase modulator PM by a corresponding phase application (bias signal; refer to FIGS. 3 and 4). The response pulse is virtually blanked by the phase application with $\pm\pi\cdot n$ (n being a positive integer), the result for the response pulse is maximum rotational rate information (operating point at the point of inflection of the Sagnac function $\cos\Omega$.)
7. In the case of phase application, the bias phase change at the phase modulator PM can be performed so that a low-frequency signal from the rotation rate of a single axis occurs at the photodetector PD (refer to FIG. 4).

The following advantages result for a three-axis fiber-optic rotation rate sensor according to the invention in contrast to a single-axis rotation rate sensor:

In terms of hardware, the electronics are identical;

The optical components are virtually identical, with the exception of two additional 1×3-couplers;

The space requirement of the sensor triad is lower by a factor of 3;

A cost saving by a factor of approximately 2.2 is realized when compared with three individual rotation rate sensors;

The reliability of a sensor triad according to the invention rises by the factor $\sqrt{3}$ since all critical components (particularly in the case of the electronic modules) are present only once rather than three times.

While luminous efficacy is reduced by a factor of approximately 9, the use of very high-intensity superluminescent diodes can be employed to compensate, at least in part, for this effect.

While the present invention has been described with reference to its presently-preferred embodiment, it is not limited thereto. Rather, this invention is only limited insofar as defined by the following set of patent claims and includes all equivalents within its scope.

What is claimed is:

1. In a multi-axis fiber-optic rotation rate sensor of the type that includes a light source followed in sequence by a fist beam splitter, a polarizer, a second beam splitter and a single phase modulator; a photodetector that accepts a second output of the first beam splitter, and an analog-to-digital converter, coupled to the photodetector, that feeds a closed loop, which resets the rotational rates through a digital-to-analog converter connected to a reset input of the phase modulator, the improvement comprising, in combination:
   a) a coupler connected to each of the two outputs of said single phase modulator for dividing the tow modulated output light beams from said second beamsplitter into an equal plurality of pairs of light beams, and radiating said beam pairs in parallel into the respective two ends of a correspond plurality of fiber coils $L_1, L_2, L_3, \ldots, L_n$ arranged in parallel, said coils having light path lengths in the ratio $L_1:L_2:L_3: \ldots :L_n = 1:2: \ldots :n$; and
   b) means for switching said light source ON/OFF with a pulse-duty factor whose ON duration corresponds to the transit time of light through the shortest fiber coil and whose OFF duration is at least equal to the transit time of light through the longest of the fiber coils $L_n$.

2. A sensor as defined in claim 1 comprising three fiber coils $L_1, L_2, L_3$ aligned for rotational speed measurements along three orthogonal spatial axes.

3. A sensor as defined in claim 2 further including:
   a) means for evaluating the output signals of said photodetector in time division multiplex so that in each case at least one time slot of the same duration within a modulation period of said readout signal is assigned to the individual spatial axes to obtain the rotation rate information of said individual spatial axes; and
   b) means for applying a bias signal of $\pm \pi (n+\frac{1}{2})$ where n is a positive integer to said phase modulator during the time slot assigned to a specific spatial axis to produce a maximum rotation rate signal for said axis, said maximum rotation rate signal occurring before or after bias signals of $\pm \pi n$ for the other spatial axes, whereby said bias signals include substantially blanking values for the readout signals of said other axes.

* * * * *